(12) United States Patent
Thota et al.

(10) Patent No.: US 12,457,169 B2
(45) Date of Patent: Oct. 28, 2025

(54) METHOD AND SYSTEM FOR PROVIDING AUTOMATED MESSAGE ROUTING

(71) Applicant: JPMorgan Chase Bank, N.A., New York, NY (US)

(72) Inventors: Narayana Swamy Thota, Podili (IN); Sudeep Sabnavis, Hyderabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 443 days.

(21) Appl. No.: 17/974,254

(22) Filed: Oct. 26, 2022

(65) Prior Publication Data

US 2024/0089196 A1 Mar. 14, 2024

(30) Foreign Application Priority Data

Sep. 13, 2022 (IN) .............................. 202211052255

(51) Int. Cl.
*H04L 45/302* (2022.01)
*H04L 51/066* (2022.01)

(52) U.S. Cl.
CPC .......... *H04L 45/306* (2013.01); *H04L 51/066* (2013.01)

(58) Field of Classification Search
CPC .... H04L 45/306; H04L 51/066; H04L 51/214
See application file for complete search history.

(56) References Cited

U.S. PATENT DOCUMENTS

| 11,611,471 | B2 * | 3/2023 | Ramasubramani ... H04L 67/303 |
| 2009/0292790 | A1 * | 11/2009 | Salonikios .............. G06F 16/10 709/217 |
| 2012/0260188 | A1 * | 10/2012 | Park ..................... G06Q 10/107 707/E17.014 |
| 2014/0040389 | A1 * | 2/2014 | Beardsmore ............ H04L 51/00 709/206 |
| 2017/0180289 | A1 * | 6/2017 | Chiappone ............ H04L 51/222 |
| 2021/0136166 | A1 * | 5/2021 | Thummala Abbigari ................... H04L 67/10 |
| 2023/0370519 | A1 * | 11/2023 | Rajagopalan ......... H04L 45/302 |

* cited by examiner

*Primary Examiner* — Austin J Moreau
(74) *Attorney, Agent, or Firm* — Greenblum & Bernstein, P.L.C.

(57) ABSTRACT

A method for providing an automated routing layer to facilitate end-to-end testing is disclosed. The method includes detecting, in real-time, electronic messages from a data stream based on a predetermined configuration; intercepting the detected electronic messages from the data stream; extracting message data from the intercepted electronic messages, the message data including payload information that corresponds to the electronic messages; determining, in real-time, downstream destination paths for each of the intercepted electronic messages based on the extracted message data and the predetermined configuration; and automatically routing, in real-time, each of the intercepted electronic messages based on the determined downstream destination paths.

20 Claims, 6 Drawing Sheets

METHOD AND SYSTEM FOR PROVIDING AUTOMATED MESSAGE ROUTING

CROSS-REFERENCE TO RELATED APPLICATIONS

This application claims the benefit of Indian Provisional Patent Application No. 202211052255, filed Sep. 13, 2022, which is hereby incorporated by reference in its entirety.

BACKGROUND

1. Field of the Disclosure

This technology generally relates to methods and systems for routing messages, and more particularly to methods and systems for providing a routing layer that automatically routes application messages to facilitate connections between an upstream operating environment and multiple downstream operating environments.

2. Background Information

Many business entities collaborate with internal partners as well as external partners on complex software development projects across multiple operating environments. Often, to test codes prior to deployment, development teams must perform tests such as, for example, end-to-end tests across the multiple operating environments. Historically, implementations of conventional techniques for connecting the multiple operating environments have resulted in varying degrees of success with respect to testing efficiency and effective resource management.

One drawback of using the conventional techniques is that in many instances, parallel support for multiple releases requires investment in the development of several operating environments. However, several of the internal partners and the external partners operate only one operating environment. As a result, efficiencies associated with the parallel support for multiple releases depend largely on availability of partner operating environments.

Therefore, there is a need to provide an automated routing solution that connects various upstream operating environments with different downstream operating environments to facilitate end-to-end testing of multiple development projects in parallel without reliance on availability of partner operating environments.

SUMMARY

The present disclosure, through one or more of its various aspects, embodiments, and/or specific features or sub-components, provides, inter alia, various systems, servers, devices, methods, media, programs, and platforms for providing a routing layer that automatically routes application messages to facilitate connections between an upstream operating environment and multiple downstream operating environments.

According to an aspect of the present disclosure, a method for providing an automated routing layer to facilitate end-to-end testing is disclosed. The method is implemented by at least one processor. The method may include detecting, in real-time, at least one electronic message from a data stream based on a predetermined configuration; intercepting the detected at least one electronic message from the data stream; extracting message data from the intercepted at least one electronic message, the message data may include payload information that corresponds to the at least one electronic message; determining, in real-time, at least one downstream destination path for the intercepted at least one electronic message based on the extracted message data and the predetermined configuration; and automatically routing, in real-time, the intercepted at least one electronic message based on the determined at least one downstream destination path.

In accordance with an exemplary embodiment, the method may further include identifying, prior to the automatic routing, at least one operating environment that corresponds to the determined at least one downstream destination path; and automatically converting the intercepted at least one electronic message into a data format that is compatible with the identified at least one operating environment.

In accordance with an exemplary embodiment, the at least one electronic message may include an event message from an upstream application, the upstream application may correspond to at least one external computing system.

In accordance with an exemplary embodiment, to detect the at least one electronic message, the method may further include identifying at least one data field in the at least one electronic message based on a corresponding message header; identifying at least one data element in a body section of the at least one electronic message, the at least one data element including a user comment; and determining whether the identified at least one data field and the identified at least one data element corresponds to the predetermined configuration.

In accordance with an exemplary embodiment, to identify the at least one data element, the method may further include parsing the body section of the at least one electronic message into at least one linguistic unit; and identifying, by using natural language processing, the at least one data element from the at least one linguistic unit.

In accordance with an exemplary embodiment, the at least one data element may correspond to a routing characteristic, the routing characteristic may include at least one from among a color characteristic, a user comment characteristic, and a header characteristic.

In accordance with an exemplary embodiment, the method may further include receiving, via a graphical user interface, at least one input from a user, the at least one input may relate to at least one user routing preference and at least one new downstream destination path; and updating the predetermined configuration based on the at least one input.

In accordance with an exemplary embodiment, the method may further include automatically generating at least one document based on a result of the automatic routing, the at least one document may include information that relates to the at least one electronic message, the message data, the at least one downstream destination path, and the result of the automatic routing; extracting at least one identifier from the at least one electronic message; and associating the automatically generated at least one document with the extracted at least one identifier.

In accordance with an exemplary embodiment, the method may further include detecting at least one error, the at least one error may correspond to at least one from among an interception error, an extraction error, a determination error, and a routing error; generating at least one log, the at least one log may include information that relates to the at least one error; and notifying at least one responsible party based on the predetermined configuration.

According to an aspect of the present disclosure, a computing device configured to implement an execution of a method for providing an automated routing layer to facilitate end-to-end testing is disclosed. The computing device including a processor; a memory; and a data transmission interface coupled to each of the processor and the memory, wherein the processor may be configured to detect, in real-time, at least one electronic message from a data stream based on a predetermined configuration; intercept the detected at least one electronic message from the data stream; extract message data from the intercepted at least one electronic message, the message data may include payload information that corresponds to the at least one electronic message; determine, in real-time, at least one downstream destination path for the intercepted at least one electronic message based on the extracted message data and the predetermined configuration; and automatically route, in real-time, the intercepted at least one electronic message based on the determined at least one downstream destination path.

In accordance with an exemplary embodiment, the processor may be further configured to identify, prior to the automatic routing, at least one operating environment that corresponds to the determined at least one downstream destination path; and automatically convert the intercepted at least one electronic message into a data format that is compatible with the identified at least one operating environment.

In accordance with an exemplary embodiment, the at least one electronic message may include an event message from an upstream application, the upstream application may correspond to at least one external computing system.

In accordance with an exemplary embodiment, to detect the at least one electronic message, the processor may be further configured to identify at least one data field in the at least one electronic message based on a corresponding message header; identify at least one data element in a body section of the at least one electronic message, the at least one data element may include a user comment; and determine whether the identified at least one data field and the identified at least one data element corresponds to the predetermined configuration.

In accordance with an exemplary embodiment, to identify the at least one data element, the processor may be further configured to parse the body section of the at least one electronic message into at least one linguistic unit; and identify, by using natural language processing, the at least one data element from the at least one linguistic unit.

In accordance with an exemplary embodiment, the at least one data element may correspond to a routing characteristic, the routing characteristic may include at least one from among a color characteristic, a user comment characteristic, and a header characteristic.

In accordance with an exemplary embodiment, the processor may be further configured to receive, via a graphical user interface, at least one input from a user, the at least one input may relate to at least one user routing preference and at least one new downstream destination path; and update the predetermined configuration based on the at least one input.

In accordance with an exemplary embodiment, the processor may be further configured to automatically generate at least one document based on a result of the automatic routing, the at least one document may include information that relates to the at least one electronic message, the message data, the at least one downstream destination path, and the result of the automatic routing; extract at least one identifier from the at least one electronic message; and associate the automatically generated at least one document with the extracted at least one identifier.

In accordance with an exemplary embodiment, the processor may be further configured to detect at least one error, the at least one error may correspond to at least one from among an interception error, an extraction error, a determination error, and a routing error; generate at least one log, the at least one log may include information that relates to the at least one error; and notify at least one responsible party based on the predetermined configuration.

According to an aspect of the present disclosure, a non-transitory computer readable storage medium storing instructions for providing an automated routing layer to facilitate end-to-end testing is disclosed. The storage medium including executable code which, when executed by a processor, may cause the processor to detect, in real-time, at least one electronic message from a data stream based on a predetermined configuration; intercept the detected at least one electronic message from the data stream; extract message data from the intercepted at least one electronic message, the message data may include payload information that corresponds to the at least one electronic message; determine, in real-time, at least one downstream destination path for the intercepted at least one electronic message based on the extracted message data and the predetermined configuration; and automatically route, in real-time, the intercepted at least one electronic message based on the determined at least one downstream destination path.

In accordance with an exemplary embodiment, the at least one electronic message may include an event message from an upstream application, the upstream application may correspond to at least one external computing system.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
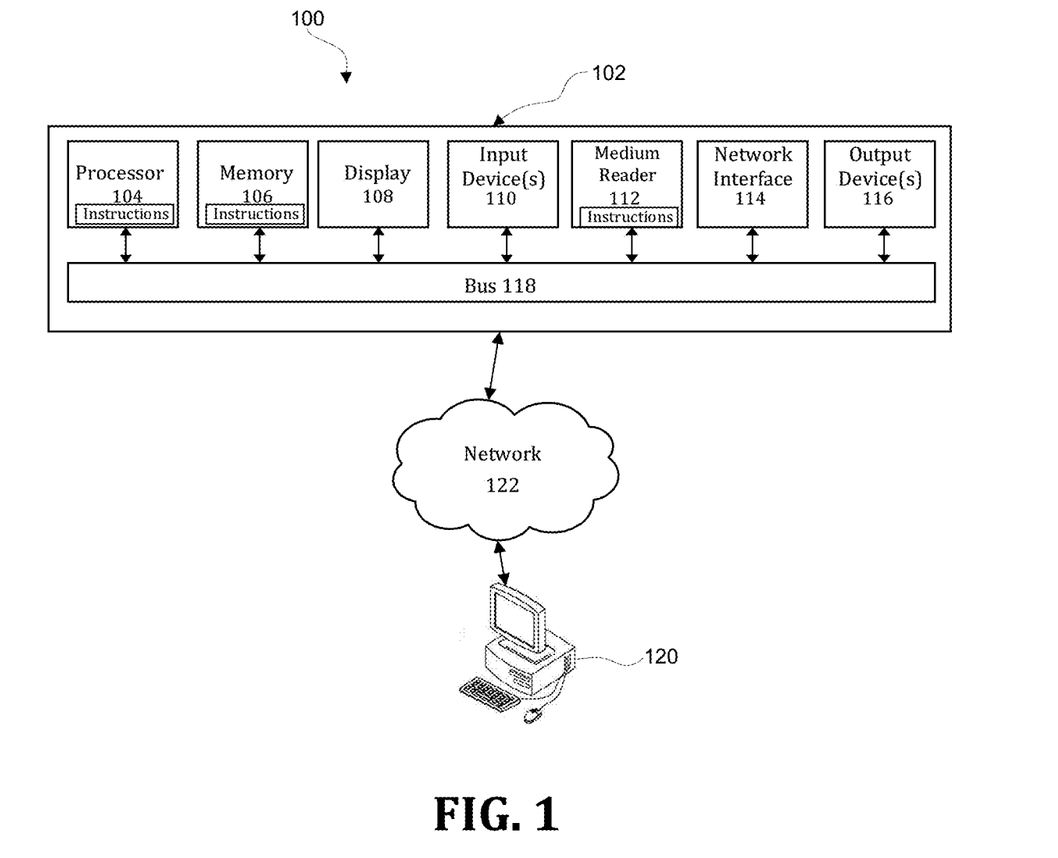
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons skilled in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing a routing layer that automatically routes application messages to facilitate connections between an upstream operating environment and multiple downstream operating environments.

Figure 2:
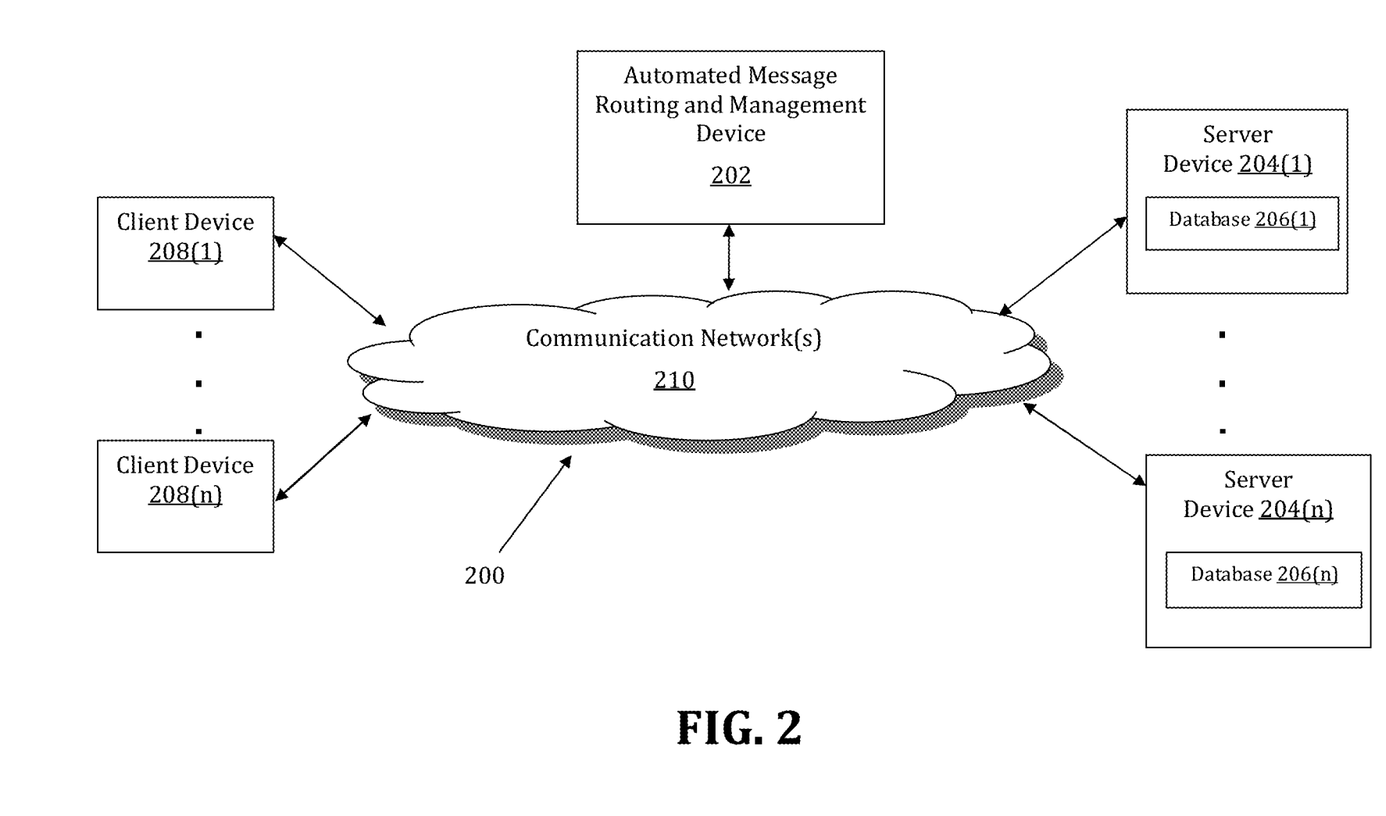
FIG. 2 illustrates an exemplary diagram of a network environment.

Referring to FIG. 2, a schematic of an exemplary network environment 200 for implementing a method for providing a routing layer that automatically routes application messages to facilitate connections between an upstream operating environment and multiple downstream operating environments is illustrated. In an exemplary embodiment, the method is executable on any networked computer platform, such as, for example, a personal computer (PC).

The method for providing a routing layer that automatically routes application messages to facilitate connections between an upstream operating environment and multiple downstream operating environments may be implemented by an Automated Message Routing and Management (AMRM) device 202. The AMRM device 202 may be the same or similar to the computer system 102 as described with respect to FIG. 1. The AMRM device 202 may store one or more applications that can include executable instructions that, when executed by the AMRM device 202, cause the AMRM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the AMRM device 202 itself, may be located in virtual server(s) running in a cloud-based computing environment rather than being tied to one or more specific physical network computing devices. Also, the application(s) may be running in one or more virtual machines (VMs) executing on the AMRM device 202. Additionally, in one or more embodiments of this technology, virtual machine(s) running on the AMRM device 202 may be managed or supervised by a hypervisor.

In the network environment 200 of FIG. 2, the AMRM device 202 is coupled to a plurality of server devices 204(1)-204(n) that hosts a plurality of databases 206(1)-206(n), and also to a plurality of client devices 208(1)-208(n) via communication network(s) 210. A communication interface of the AMRM device 202, such as the network interface 114 of the computer system 102 of FIG. 1, operatively couples and communicates between the AMRM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the AMRM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and AMRM devices that efficiently implement a method for providing a routing layer that automatically routes application messages to facilitate connections between an upstream operating environment and multiple downstream operating environments.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The AMRM device 202 may be a standalone device or integrated with one or more other devices or apparatuses, such as one or more of the server devices 204(1)-204(n), for example. In one particular example, the AMRM device 202 may include or be hosted by one of the server devices 204(1)-204(n), and other arrangements are also possible. Moreover, one or more of the devices of the AMRM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the AMRM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to electronic messages, application event messages, predetermined configurations, message data, payload information, downstream destination path, operating environments, data fields, message headers, data elements, body sections, linguistic units, and routing characteristics.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the AMRM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the AMRM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the AMRM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the AMRM device 202, the server devices 204(1)-204(n), or the client devices 208(1)-208(n), for example, may be configured to operate as virtual instances on the same physical machine. In other words, one or more of the AMRM device 202, the server devices 204(1)-204(n), or the client devices 208(1)-208(n) may operate on the same physical device rather than as separate devices communicating through communication network(s) 210. Additionally, there may be more or fewer AMRM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
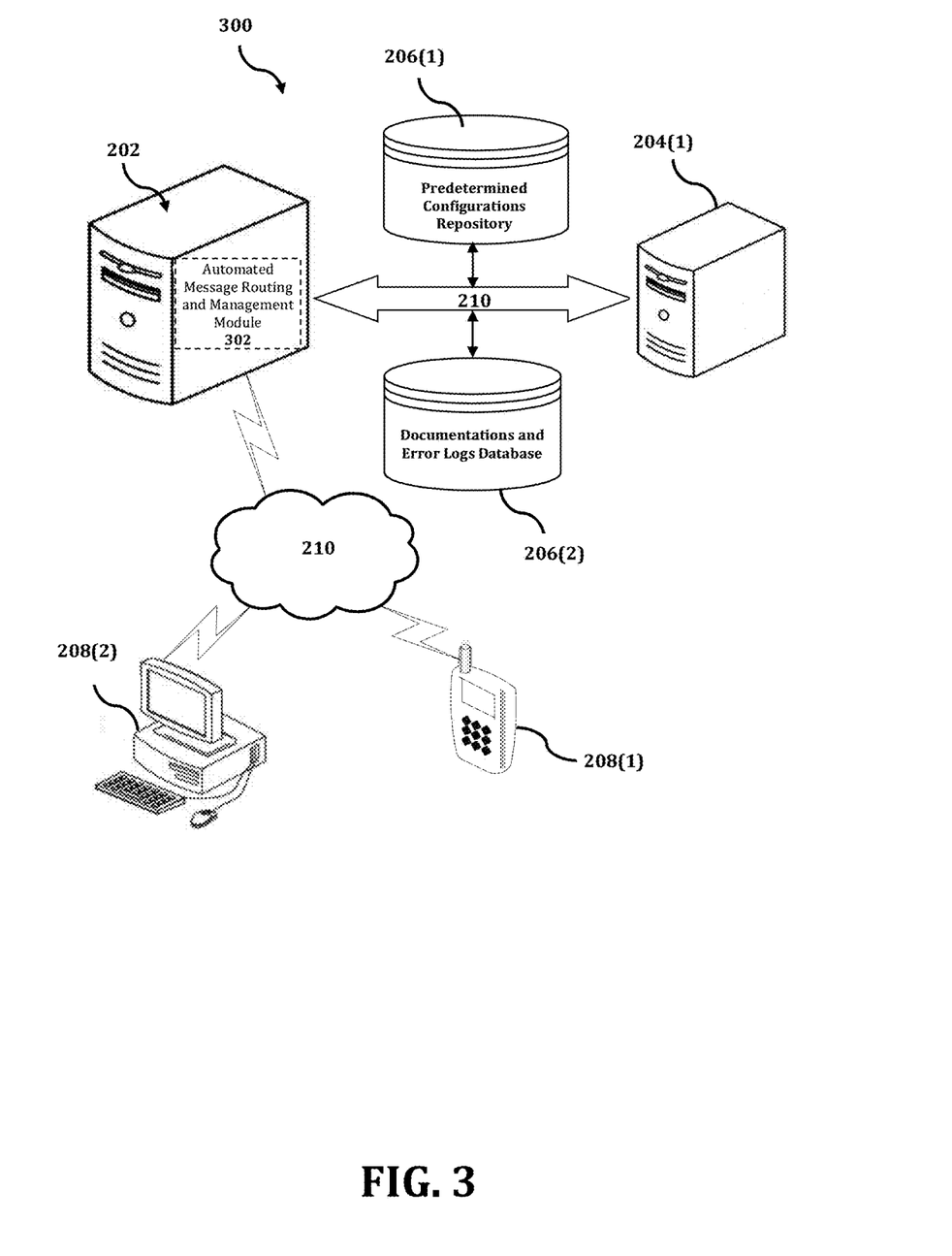
FIG. 3 shows an exemplary system for implementing a method for providing a routing layer that automatically routes application messages to facilitate connections between an upstream operating environment and multiple downstream operating environments.

The AMRM device 202 is described and shown in FIG. 3 as including an automated message routing and management module 302, although it may include other rules, policies, modules, databases, or applications, for example. As will be described below, the automated message routing and management module 302 is configured to implement a method for providing a routing layer that automatically routes application messages to facilitate connections between an upstream operating environment and multiple downstream operating environments.

An exemplary process 300 for implementing a mechanism for providing a routing layer that automatically routes application messages to facilitate connections between an upstream operating environment and multiple downstream operating environments by utilizing the network environment of FIG. 2 is shown as being executed in FIG. 3. Specifically, a first client device 208(1) and a second client device 208(2) are illustrated as being in communication with AMRM device 202. In this regard, the first client device 208(1) and the second client device 208(2) may be "clients" of the AMRM device 202 and are described herein as such. Nevertheless, it is to be known and understood that the first client device 208(1) and/or the second client device 208(2) need not necessarily be "clients" of the AMRM device 202, or any entity described in association therewith herein. Any additional or alternative relationship may exist between either or both of the first client device 208(1) and the second client device 208(2) and the AMRM device 202, or no relationship may exist.

Further, AMRM device 202 is illustrated as being able to access a predetermined configurations repository 206(1) and a documentations and error logs database 206(2). The automated message routing and management module 302 may be configured to access these databases for implementing a method for providing a routing layer that automatically routes application messages to facilitate connections between an upstream operating environment and multiple downstream operating environments.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the AMRM device 202 via broadband or cellular communication. Of course, these embodiments are merely exemplary and are not limiting or exhaustive.

Upon being started, the automated message routing and management module 302 executes a process for providing a routing layer that automatically routes application messages to facilitate connections between an upstream operating environment and multiple downstream operating environments. An exemplary process for providing a routing layer that automatically routes application messages to facilitate connections between an upstream operating environment and multiple downstream operating environments is generally indicated at flowchart 400 in FIG. 4.

Figure 4:
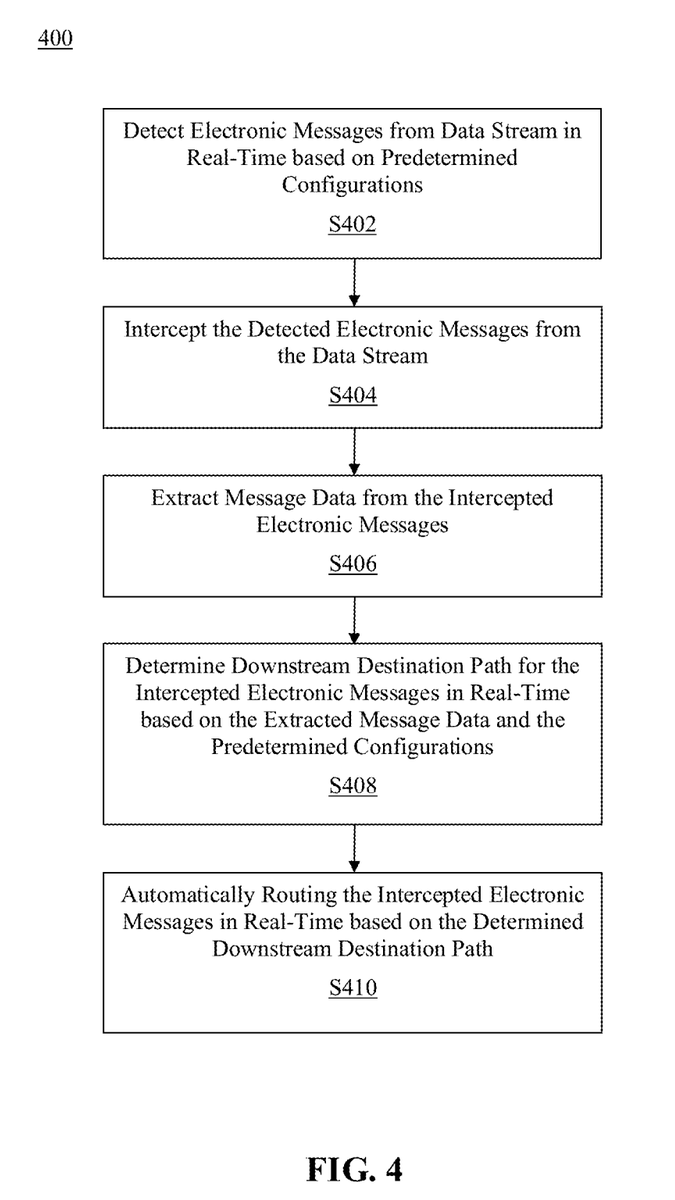
FIG. 4 is a flowchart of an exemplary process for implementing a method for providing a routing layer that automatically routes application messages to facilitate connections between an upstream operating environment and multiple downstream operating environments.

In the process 400 of FIG. 4, at step S402, electronic messages may be detected in real-time from a data stream based on a predetermined configuration. In an exemplary embodiment, the electronic messages may include an event message from an upstream application. The upstream application may correspond to an internal computing system as well as an external computing system. In another exemplary embodiment, the electronic messages may relate to a distributed publish-subscribe messaging system that manages message queues to control a high volume of data. The publish-subscribe messaging system may enable the passing of messages from one endpoint such as, for example, an application to another.

In another exemplary embodiment, the application may include at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform such as, for example, an APACHE KAFKA platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

In another exemplary embodiment, the data stream may be monitored in real-time based on the predetermined configuration. The data stream may be actively monitored to detect electronic messages that correspond to the predetermined configuration. For example, the predetermined configuration may indicate that the data stream is continuously monitored for event messages in active systems where interaction with upstream applications may occur at any time.

In another exemplary embodiment, the data stream may be monitored based on a schedule according to the predetermined configuration. The schedule may include specific intervals for monitoring the data stream to detect the electronic messages. For example, the predetermined configuration may indicate that the data stream is monitored daily at a specific time that coincides with an electronic message transmission schedule. In another example, the predetermined configuration may provide a known testing schedule when electronic message transmissions are expected. The data stream may be monitored based on the known testing schedule to improve resource management when electronic message transmission is not expected.

In another exemplary embodiment, the predetermined configuration may correspond to an arrangement and/or a setup of functional units such as, for example, hardware components and software components. The arrangement and/or the setup of the functional units may provide instructions for the detection of electronic messages and the determination of corresponding actions such as, for example, when and where to route the electronic messages. For example, the predetermined configuration may indicate that electronic messages with a specific identifier in the message header must be routed to a corresponding downstream system. Similarly, in another example, the predetermined configuration may provide desired routing characteristics such as, for example, at least one from among a message color characteristic, a user comment characteristic, and a message header characteristic.

In another exemplary embodiment, the predetermined configuration may be established during a required onboarding process and updated as necessary by a user via a graphical user interface. To update the predetermined configuration, an input may be received from the user via the graphical user interface. The input may relate to user routing preferences and new downstream destination paths for specific electronic messages. Consistent with present disclosures, the input may include necessary parameters such as, for example, routing characteristics for the specific electronic messages. Then, the predetermined configuration may be updated based on the received input. The updated predetermined configuration may be persisted to facilitate actions consistent with present disclosure.

In another exemplary embodiment, detecting the electronic messages may include identifying data fields in the electronic messages based on a corresponding message header. For example, the name of an upstream application may be identified from a name data field of the electronic messages. Additionally, data elements in a body section of the electronic messages may be identified. The data elements may include a user comment in a data format such as, for example, a natural language format. Consistent with present disclosures, the data elements may correspond to routing characteristics that includes at least one from among a message color characteristic, a user comment characteristic, and a header characteristic. Then, a determination may be made as to whether the identified data field and the identified data element corresponds to the predetermined configuration. For example, the identified data element in the body section may relate to a user comment that corresponds to parameters in the predetermined configuration.

In another exemplary embodiment, identifying the data elements from the body section of the electronic messages may include parsing the body section into a plurality of linguistic units. The plurality of linguistic units may correspond to a natural unit such as, for example, a word and/or a sentence into which linguistic messages can be analyzed according to grammatical rules such as, for example, English language grammatical rules. Then, a model may be used to identify the desired data element from the plurality of linguistic units.

In another exemplary embodiment, the model may include at least one from among a natural language processing model, a machine learning model, a mathematical model, a process model, and a data model. The model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

In another exemplary embodiment, the natural language processing model may correspond to a plurality of natural language processing techniques. The natural language processing techniques may include at least one from among a sentiment analysis technique, a named entity recognition technique, a summarization technique, a topic modeling technique, a text classification technique, a keyword extraction technique, and a lemmatization and stemming technique. As will be appreciated by a person of ordinary skill in the art, natural language processing may relate to computer processing and analyzing of large quantities of natural language data.

At step S404, the detected electronic messages may be intercepted from the data stream. In an exemplary embodiment, interception of the detected electronic messages may include removing the detected electronic messages from the data stream for further processing consistent with present disclosures. The detected electronic messages may be removed from the data stream by simply deleting the electronic messages from the data stream. In another exemplary embodiment, interception of the detected electronic messages may include creating a copy of the electronic messages for further processing consistent with present disclosures. The detected electronic messages may be copied from the data stream resulting in duplicate versions of the detected electronic messages. To prevent duplicate processing, the remaining electronic messages in the data stream may be modified with an identifier to indicate obsolescence.

At step S406, message data may be extracted from the intercepted electronic messages. The message data may include payload information that corresponds to the electronic messages. In another exemplary embodiment, the payload information may correspond to information in various sections of the electronic messages. For example, the payload information may include user comments in a body section of the electronic messages. The payload information may define the type of data in the electronic messages as well as include the content of the electronic messages. Consistent with present disclosures, the payload information may include routing characteristics such as, for example, a message color characteristic, a user comment characteristic, and a header characteristic that facilitates determination of corresponding downstream systems.

At step S408, downstream destination paths for each of the intercepted electronic messages may be determined in real-time. The downstream destination paths may be determined for each of the intercepted electronic messages based on the extracted message data and the predetermined configuration. Consistent with present disclosures, the predetermined configuration may provide parameters for the routing of the electronic messages. For example, the predetermined configuration may indicate that electronic messages from upstream application A is always routed to downstream application B to facilitate end-to-end testing of applications A and B. In another example, the predetermined configuration may indicate that electronic messages with user comment C is always routed to downstream application D to satisfy user routing requirements.

At step S410, the intercepted electronic messages may be automatically routed in real-time. The intercepted electronic messages may be automatically routed based on the determined downstream destination paths. In another exemplary embodiment, the intercepted electronic messages may be automatically routed in real-time without additional user intervention. As will be appreciated by a person of ordinary skill in the art, the electronic messages may be automatically routed to an appropriate destination as though the electronic messages were part of a single data stream. As such, end-to-end testing of several different operating environments may be enabled because the data flow remains consistent despite the singular upstream operating environment and the multiple downstream operating environments, and vice versa.

In another exemplary embodiment, the electronic messages may be automatically converted for compatibility between various downstream operating environments. To facilitate the automated conversion, downstream operating environments that correspond to the determined downstream destination path may be identified. The downstream operating environments may be automatically identified prior to initiation of the automatic routing. Then, the intercepted electronic message may be automatically converted into a data format that is compatible with the identified downstream operating environments. As will be appreciated by a person of ordinary skill in the art, the intercepted electronic message may be converted based on a mapping of data with corresponding elements in a desired data format.

In another exemplary embodiment, documentation may be automatically generated for each of the routed electronic messages. The documentation may be automatically generated based on a result of the automatic routing. The documentation may include information that relates to the electronic messages, the message data, the downstream destination paths, and a result of the automatic routing. In another exemplary embodiment, an identifier may be extracted from each of the electronic messages. The identifier may include information that relates to the upstream system such as, for example, an upstream application identifier. Then, the automatically generation documentation may be associated with the extracted identifier. The association of a routing action with an identifier may enable improved future routing determinations based on historical usage. For example, nonstandard electronic messages from application A may be automatically routed to application B based on a historical routing of known and standard electronic messages between applications A and B.

In another exemplary embodiment, errors may be automatically identified for each of the routed electronic messages. The errors may be automatically detected based on a result of the automatic routing. The errors may correspond to at least one from among an interception error, an extraction error, a determination error, and a routing error. Consistent with present disclosures, the errors may correspond to any automated and manual actions associated with the routing of the electronic messages. Then, a log may be automatically generated to record the detected error. The log may include information such as, for example, system status information that relates to each of the detected errors. In another exemplary embodiment, a responsible party may be notified of the detected errors based on the predetermined configuration. The responsible party may be notified of the errors and provided information relating to the errors via a communication interface such as, for example, an email and/or a popup on a graphical user interface.

Figure 5:
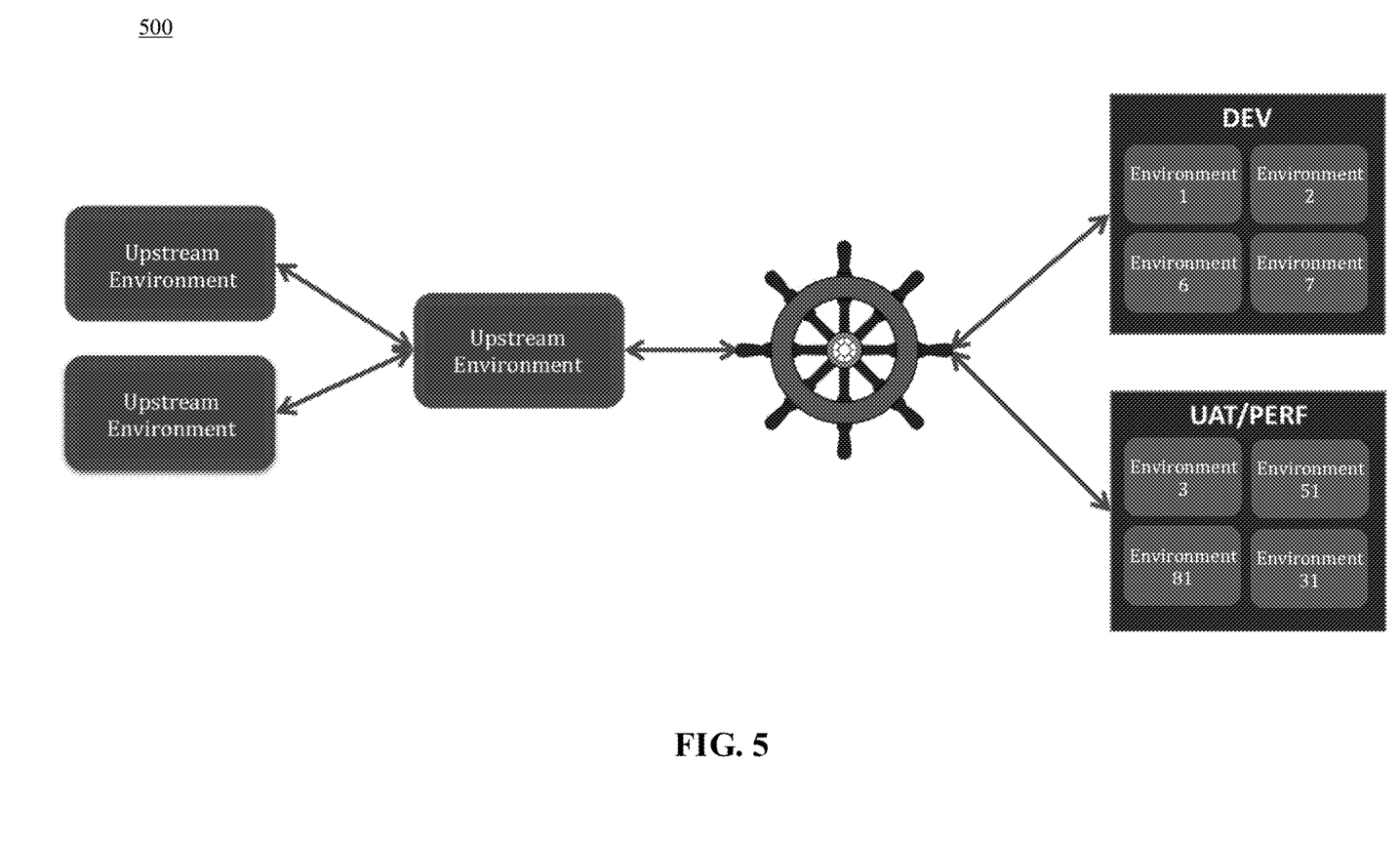
FIG. 5 is a flow diagram of an exemplary message queue router process for implementing a method for providing a routing layer that automatically routes application messages to facilitate connections between an upstream operating environment and multiple downstream operating environments.

FIG. 5 is a flow diagram 500 of an exemplary message queue router process for implementing a method for providing a routing layer that automatically routes application messages to facilitate connections between an upstream operating environment and multiple downstream operating environments. As illustrated in FIG. 5, electronic messages from multiple upstream operating environments may be processed consistent with present disclosures and automatically routed to appropriate downstream operating environments.

Figure 6:
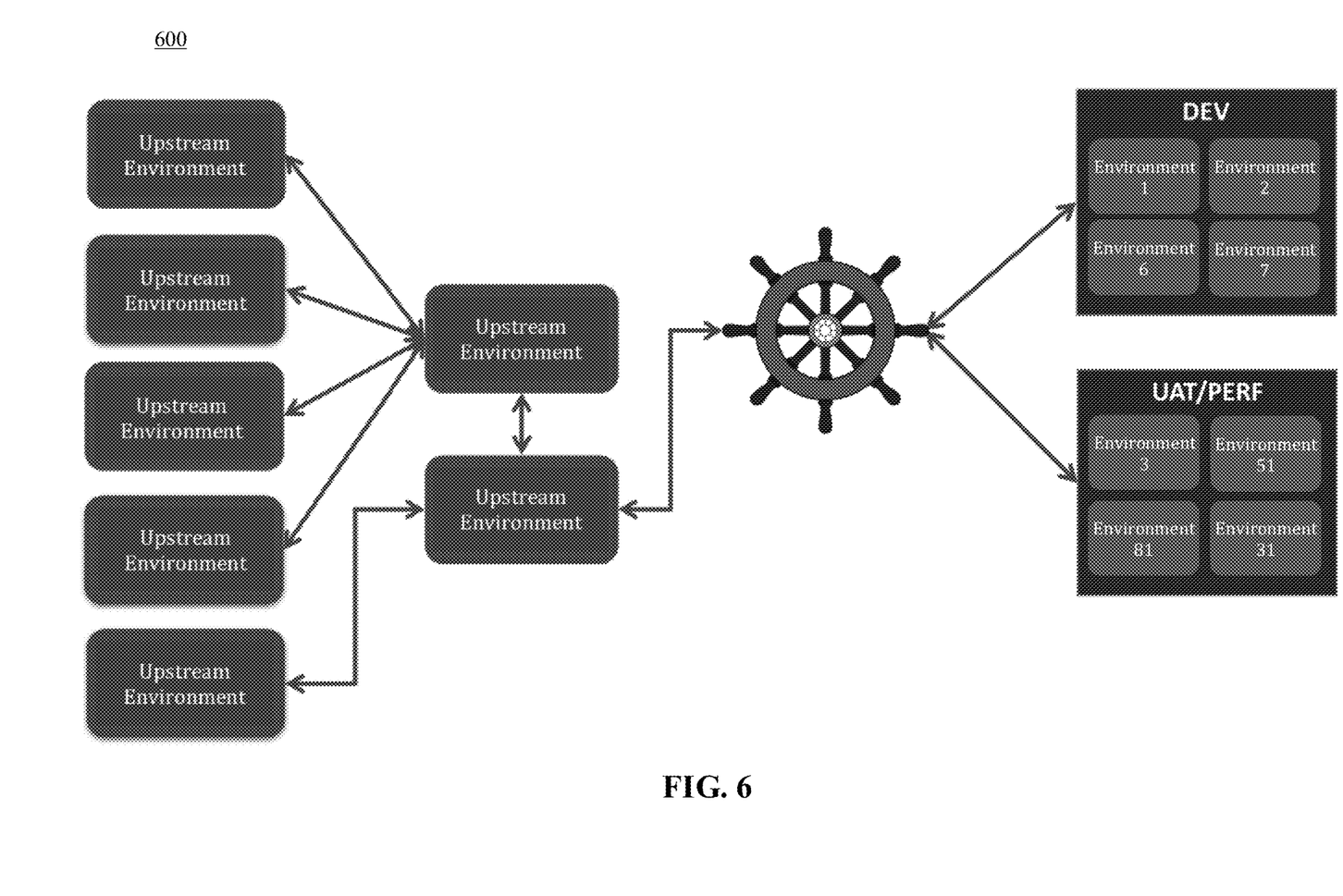
FIG. 6 is a flow diagram of an exemplary web service router process for implementing a method for providing a routing layer that automatically routes application messages to facilitate connections between an upstream operating environment and multiple downstream operating environments.

FIG. 6 is a flow diagram 600 of an exemplary web service router process for implementing a method for providing a routing layer that automatically routes application messages to facilitate connections between an upstream operating environment and multiple downstream operating environments. As illustrated in FIG. 6, electronic messages from an upstream operating environment such as, for example, multiple web services may be processed consistent with present disclosures and automatically routed to appropriate downstream operating environments.

Accordingly, with this technology, an optimized process for providing a routing layer that automatically routes application messages to facilitate connections between an upstream operating environment and multiple downstream operating environments is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing an automated routing layer to facilitate end-to-end testing, the method being implemented by at least one processor, the method comprising:
   detecting, by the at least one processor in real-time, at least one electronic message of a publish-subscribe messenger from a data stream based on a predetermined configuration, wherein the publish-subscribe messenger manages message queues and enables passing of messages between applications, wherein the predetermined configuration indicates that the data stream is monitored for event messages in an active system that interacts with an upstream application and provides parameters for routing of the electronic message between the applications, and wherein the event messages indicate a change in state of hardware of the active system;
   intercepting, by the at least one processor, the detected at least one electronic message from the data stream;
   extracting, by the at least one processor, message data from the intercepted at least one electronic message, the message data including payload information that corresponds to the at least one electronic message;
   determining, by the at least one processor in real-time, at least one downstream destination path for the intercepted at least one electronic message based on the extracted message data and the predetermined configuration; and
   automatically routing, by the at least one processor in real-time, the intercepted at least one electronic message based on the determined at least one downstream destination path.

2. The method of claim 1, further comprises:
   identifying, by the at least one processor prior to the automatic routing, at least one operating environment that corresponds to the determined at least one downstream destination path; and
   automatically converting, by the at least one processor, the intercepted at least one electronic message into a data format that is compatible with the identified at least one operating environment.

3. The method of claim 1, wherein the at least one electronic message includes one of the event messages from the upstream application, the upstream application corresponding to at least one external computing system.

4. The method of claim 1, wherein detecting the at least one electronic message further comprises:
   identifying, by the at least one processor, at least one data field in the at least one electronic message based on a corresponding message header;
   identifying, by the at least one processor, at least one data element in a body section of the at least one electronic message, the at least one data element including a user comment; and
   determining, by the at least one processor, whether the identified at least one data field and the identified at least one data element corresponds to the predetermined configuration.

5. The method of claim 4, wherein identifying the at least one data element further comprises:
   parsing, by the at least one processor, the body section of the at least one electronic message into at least one linguistic unit; and
   identifying, by the at least one processor using natural language processing, the at least one data element from the at least one linguistic unit.

6. The method of claim 4, wherein the at least one data element corresponds to a routing characteristic, the routing characteristic including at least one from among a color characteristic, a user comment characteristic, and a header characteristic.

7. The method of claim 1, further comprising:
   receiving, by the at least one processor via a graphical user interface, at least one input from a user, the at least one input relating to at least one user routing preference and at least one new downstream destination path; and
   updating, by the at least one processor, the predetermined configuration based on the at least one input.

8. The method of claim 1, further comprising:
   automatically generating, by the at least one processor, at least one document based on a result of the automatic routing, the at least one document including information that relates to the at least one electronic message, the message data, the at least one downstream destination path, and the result of the automatic routing;
   extracting, by the at least one processor, at least one identifier from the at least one electronic message; and
   associating, by the at least one processor, the automatically generated at least one document with the extracted at least one identifier, wherein subsequent automated routing is based on the association of the automatically generated at least one document with the extracted at least one identifier and the result of the automatic routing.

9. The method of claim 1, further comprising:
   detecting, by the at least one processor, at least one error, the at least one error corresponding to at least one from among an interception error, an extraction error, a determination error, and a routing error;
   generating, by the at least one processor, at least one log, the at least one log including information that relates to the at least one error; and
   notifying, by the at least one processor, at least one responsible party based on the predetermined configuration.

10. A computing device configured to implement an execution of a method for providing an automated routing layer to facilitate end-to-end testing, the computing device comprising:
   a processor;
   a memory; and
   a data transmission interface coupled to each of the processor and the memory,
   wherein the processor is configured to:
      detect, in real-time, at least one electronic message of a publish-subscribe messenger from a data stream based on a predetermined configuration, wherein the publish-subscribe messenger manages message queues and enables passing of messages between applications, wherein the predetermined configuration indicates that the data stream is monitored for event messages in an active system that interacts with an upstream application and provides parameters for routing of the electronic message between the applications, and wherein the event messages indicate a change in state of hardware of the active system;
      intercept the detected at least one electronic message from the data stream;

extract message data from the intercepted at least one electronic message, the message data including payload information that corresponds to the at least one electronic message;

determine, in real-time, at least one downstream destination path for the intercepted at least one electronic message based on the extracted message data and the predetermined configuration; and automatically route, in real-time, the intercepted at least one electronic message based on the determined at least one downstream destination path.

11. The computing device of claim 10, wherein the processor is further configured to:

identify, prior to the automatic routing, at least one operating environment that corresponds to the determined at least one downstream destination path; and automatically convert the intercepted at least one electronic message into a data format that is compatible with the identified at least one operating environment.

12. The computing device of claim 10, wherein the at least one electronic message includes one of the event messages from the upstream application, the upstream application corresponding to at least one external computing system.

13. The computing device of claim 10, wherein, to detect the at least one electronic message, the processor is further configured to:

identify at least one data field in the at least one electronic message based on a corresponding message header;

identify at least one data element in a body section of the at least one electronic message, the at least one data element including a user comment; and determine whether the identified at least one data field and the identified at least one data element corresponds to the predetermined configuration.

14. The computing device of claim 13, wherein, to identify the at least one data element, the processor is further configured to:

parse the body section of the at least one electronic message into at least one linguistic unit; and identify, by using natural language processing, the at least one data element from the at least one linguistic unit.

15. The computing device of claim 13, wherein the at least one data element corresponds to a routing characteristic, the routing characteristic including at least one from among a color characteristic, a user comment characteristic, and a header characteristic.

16. The computing device of claim 10, wherein the processor is further configured to:

receive, via a graphical user interface, at least one input from a user, the at least one input relating to at least one user routing preference and at least one new downstream destination path; and update the predetermined configuration based on the at least one input.

17. The computing device of claim 10, wherein the processor is further configured to:

automatically generate at least one document based on a result of the automatic routing, the at least one document including information that relates to the at least one electronic message, the message data, the at least one downstream destination path, and the result of the automatic routing;

extract at least one identifier from the at least one electronic message; and associate the automatically generated at least one document with the extracted at least one identifier, wherein subsequent automated routing is based on the association of the automatically generated at least one document with the extracted at least one identifier and the result of the automatic routing.

18. The computing device of claim 10, wherein the processor is further configured to:

detect at least one error, the at least one error corresponding to at least one from among an interception error, an extraction error, a determination error, and a routing error;

generate at least one log, the at least one log including information that relates to the at least one error; and notify at least one responsible party based on the predetermined configuration.

19. A non-transitory computer readable storage medium storing instructions for providing an automated routing layer to facilitate end-to-end testing, the storage medium comprising executable code which, when executed by a processor, causes the processor to:

detect, in real-time, at least one electronic message of a publish-subscribe messenger from a data stream based on a predetermined configuration, wherein the publish-subscribe messenger manages message queues and enables passing of messages between applications, wherein the predetermined configuration indicates that the data stream is monitored for event messages in an active system that interacts with an upstream application and provides parameters for routing of the electronic message between the applications, and wherein the event messages indicate a change in state of hardware of the active system;

intercept the detected at least one electronic message from the data stream;

extract message data from the intercepted at least one electronic message, the message data including payload information that corresponds to the at least one electronic message;

determine, in real-time, at least one downstream destination path for the intercepted at least one electronic message based on the extracted message data and the predetermined configuration; and automatically route, in real-time, the intercepted at least one electronic message based on the determined at least one downstream destination path.

20. The storage medium of claim 19, wherein the at least one electronic message includes one of the event messages from the upstream application, the upstream application corresponding to at least one external computing system.

* * * * *